(12) United States Patent
Quanci et al.

(10) Patent No.: US 11,117,087 B2
(45) Date of Patent: Sep. 14, 2021

(54) SYSTEMS AND METHODS FOR REMOVING MERCURY FROM EMISSIONS

(71) Applicant: SUNCOKE TECHNOLOGY AND DEVELOPMENT LLC., Lisle, IL (US)

(72) Inventors: John Francis Quanci, Haddonfield, NJ (US); Ashley Nicole Seaton, Lisle, IL (US); Justin Leigh Prien, Glendale, MO (US); Jennifer Renee McLaren, Granite City, IL (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 407 days.

(21) Appl. No.: 16/000,516

(22) Filed: Jun. 5, 2018

(65) Prior Publication Data

US 2019/0099708 A1    Apr. 4, 2019

Related U.S. Application Data

(63) Continuation of application No. 14/655,204, filed as application No. PCT/US2012/072167 on Dec. 28, 2012, now Pat. No. 10,016,714.

(51) Int. Cl.
*B01D 53/02* (2006.01)
*B01D 53/64* (2006.01)
*B01D 53/50* (2006.01)

(52) U.S. Cl.
CPC .......... *B01D 53/025* (2013.01); *B01D 53/64* (2013.01); *B01D 53/50* (2013.01); *B01D 2253/102* (2013.01); *B01D 2257/602* (2013.01)

(58) Field of Classification Search
CPC ........ B01D 2253/102; B01D 2257/602; B01D 53/025; B01D 53/50; B01D 53/62
See application file for complete search history.

(56) References Cited

U.S. PATENT DOCUMENTS

| 425,797 A | 4/1890 | Hunt |
|---|---|---|
| 469,868 A | 3/1892 | Osbourn |

(Continued)

FOREIGN PATENT DOCUMENTS

| CA | 1172895 | 8/1984 |
|---|---|---|
| CA | 2775992 | 5/2011 |

(Continued)

OTHER PUBLICATIONS

U.S. Appl. No. 16/251,352, filed Jan. 18, 2019, Quanci et al.

(Continued)

*Primary Examiner* — Christopher P Jones
(74) *Attorney, Agent, or Firm* — Perkins Coie LLP (57) ABSTRACT

The present technology is generally directed to systems and methods for removing mercury from emissions. More specifically, some embodiments are directed to systems and methods for removing mercury from exhaust gas in a flue gas desulfurization system. In one embodiment, a method of removing mercury from exhaust gas in a flue gas desulfurization system includes inletting the gas into a housing and conditioning an additive. In some embodiments, conditioning the additive comprises hydrating powder-activated carbon. The method further includes introducing the conditioned additive into the housing and capturing mercury from the gas.

13 Claims, 6 Drawing Sheets

(56) References Cited

U.S. PATENT DOCUMENTS

| | | |
|---|---|---|
| 845,719 A | 2/1907 | Schniewind |
| 976,580 A | 7/1909 | Krause |
| 1,140,798 A | 5/1915 | Carpenter |
| 1,424,777 A | 8/1922 | Schondeling |
| 1,430,027 A | 9/1922 | Plantinga |
| 1,486,401 A | 3/1924 | Van Ackeren |
| 1,530,995 A | 3/1925 | Geiger |
| 1,572,391 A | 2/1926 | Klaiber |
| 1,677,973 A | 7/1928 | Marquard |
| 1,705,039 A | 3/1929 | Thornhill |
| 1,721,813 A | 7/1929 | Geipert |
| 1,757,682 A | 5/1930 | Palm |
| 1,818,370 A | 8/1931 | Wine |
| 1,818,994 A | 8/1931 | Kreisinger |
| 1,830,951 A | 11/1931 | Lovett |
| 1,848,818 A | 3/1932 | Becker |
| 1,947,499 A | 2/1934 | Schrader et al. |
| 1,955,962 A | 4/1934 | Jones |
| 2,075,337 A | 3/1937 | Burnaugh |
| 2,141,035 A | 12/1938 | Daniels |
| 2,195,466 A | 4/1940 | Otto |
| 2,235,970 A | 3/1941 | Wilputte |
| 2,340,981 A | 2/1944 | Otto |
| 2,394,173 A | 2/1946 | Harris et al. |
| 2,424,012 A | 7/1947 | Bangham et al. |
| 2,641,575 A | 6/1953 | Otto |
| 2,649,978 A | 8/1953 | Such |
| 2,667,185 A | 1/1954 | Beavers |
| 2,723,725 A | 11/1955 | Keiffer |
| 2,756,842 A | 7/1956 | Chamberlin et al. |
| 2,813,708 A | 11/1957 | Frey |
| 2,827,424 A | 3/1958 | Homan |
| 2,873,816 A | 2/1959 | Emil et al. |
| 2,902,991 A | 9/1959 | Whitman |
| 2,907,698 A | 10/1959 | Schulz |
| 3,015,893 A | 1/1962 | McCreary |
| 3,033,764 A | 5/1962 | Hannes |
| 3,224,805 A | 12/1965 | Clyatt |
| 3,448,012 A | 6/1969 | Allred |
| 3,462,345 A | 8/1969 | Kernan |
| 3,511,030 A | 5/1970 | Brown et al. |
| 3,542,650 A | 11/1970 | Kulakov |
| 3,545,470 A | 12/1970 | Paton |
| 3,592,742 A | 7/1971 | Thompson |
| 3,616,408 A | 10/1971 | Hickam |
| 3,623,511 A | 11/1971 | Levin |
| 3,630,852 A | 12/1971 | Nashan et al. |
| 3,652,403 A | 3/1972 | Knappstein et al. |
| 3,676,305 A | 7/1972 | Cremer |
| 3,709,794 A | 1/1973 | Kinzler et al. |
| 3,710,551 A | 1/1973 | Sved |
| 3,746,626 A | 7/1973 | Morrison, Jr. |
| 3,748,235 A | 7/1973 | Pries |
| 3,784,034 A | 1/1974 | Thompson |
| 3,806,032 A | 4/1974 | Pries |
| 3,811,572 A | 5/1974 | Tatterson |
| 3,836,161 A | 10/1974 | Pries |
| 3,839,156 A | 10/1974 | Jakobie et al. |
| 3,844,900 A | 10/1974 | Schulte |
| 3,857,758 A | 12/1974 | Mole |
| 3,875,016 A | 4/1975 | Schmidt-Balve |
| 3,876,143 A | 4/1975 | Rossow et al. |
| 3,876,506 A | 4/1975 | Dix et al. |
| 3,878,053 A | 4/1975 | Hyde |
| 3,894,302 A | 7/1975 | Lasater |
| 3,897,312 A | 7/1975 | Armour et al. |
| 3,906,992 A | 9/1975 | Leach |
| 3,912,091 A | 10/1975 | Thompson |
| 3,912,597 A | 10/1975 | MacDonald |
| 3,917,458 A | 11/1975 | Polak |
| 3,928,144 A | 12/1975 | Jakimowicz |
| 3,930,961 A | 1/1976 | Sustarsic et al. |
| 3,933,443 A | 1/1976 | Lohrmann |
| 3,957,591 A | 5/1976 | Riecker |
| 3,959,084 A | 5/1976 | Price |
| 3,963,582 A | 6/1976 | Helm et al. |
| 3,969,191 A | 7/1976 | Bollenbach |
| 3,975,148 A | 8/1976 | Fukuda et al. |
| 3,984,289 A | 10/1976 | Sustarsic et al. |
| 4,004,702 A | 1/1977 | Szendroi |
| 4,004,983 A | 1/1977 | Pries |
| 4,025,395 A | 5/1977 | Ekholm et al. |
| 4,040,910 A | 8/1977 | Knappstein et al. |
| 4,045,056 A | 8/1977 | Kandakov et al. |
| 4,045,299 A | 8/1977 | McDonald |
| 4,059,885 A | 11/1977 | Oldengott |
| 4,067,462 A | 1/1978 | Thompson |
| 4,083,753 A | 4/1978 | Rogers et al. |
| 4,086,231 A | 4/1978 | Ikio |
| 4,093,245 A | 6/1978 | Connor |
| 4,100,033 A | 7/1978 | Holter |
| 4,111,757 A | 9/1978 | Carimboli |
| 4,124,450 A | 11/1978 | MacDonald |
| 4,135,948 A | 1/1979 | Mertens et al. |
| 4,141,796 A | 2/1979 | Clark et al. |
| 4,145,195 A | 3/1979 | Knappstein et al. |
| 4,147,230 A | 4/1979 | Ormond et al. |
| 4,162,546 A | 7/1979 | Shortell et al. |
| 4,181,459 A | 1/1980 | Price |
| 4,189,272 A | 2/1980 | Gregor et al. |
| 4,194,951 A | 3/1980 | Pries |
| 4,196,053 A | 4/1980 | Grohmann |
| 4,211,608 A | 7/1980 | Kwasnoski et al. |
| 4,211,611 A | 7/1980 | Bocsanczy |
| 4,213,489 A | 7/1980 | Cain |
| 4,213,828 A | 7/1980 | Calderon |
| 4,222,748 A | 9/1980 | Argo et al. |
| 4,222,824 A | 9/1980 | Flockenhaus et al. |
| 4,224,109 A | 9/1980 | Flockenhaus et al. |
| 4,225,393 A | 9/1980 | Gregor et al. |
| 4,235,830 A | 11/1980 | Bennett et al. |
| 4,239,602 A | 12/1980 | La Bate |
| 4,248,671 A | 2/1981 | Belding |
| 4,249,997 A | 2/1981 | Schmitz |
| 4,263,099 A | 4/1981 | Porter |
| 4,268,360 A | 5/1981 | Tsuzuki et al. |
| 4,271,814 A | 6/1981 | Lister |
| 4,284,478 A | 8/1981 | Brommel |
| 4,285,772 A | 8/1981 | Kress |
| 4,287,024 A | 9/1981 | Thompson |
| 4,289,479 A | 9/1981 | Johnson |
| 4,289,584 A | 9/1981 | Chuss et al. |
| 4,289,585 A | 9/1981 | Wagener et al. |
| 4,296,938 A | 10/1981 | Offermann et al. |
| 4,299,666 A | 11/1981 | Ostmann |
| 4,302,935 A | 12/1981 | Cousimano |
| 4,303,615 A | 12/1981 | Jarmell et al. |
| 4,307,673 A | 12/1981 | Caughey |
| 4,314,787 A | 2/1982 | Kwasnik et al. |
| 4,324,568 A | 4/1982 | Wilcox et al. |
| 4,330,372 A | 5/1982 | Cairns et al. |
| 4,334,963 A | 6/1982 | Stog |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,344,822 A | 8/1982 | Schwartz et al. |
| 4,353,189 A | 10/1982 | Thiersch et al. |
| 4,366,029 A | 12/1982 | Bixby et al. |
| 4,373,244 A | 2/1983 | Mertens et al. |
| 4,375,388 A | 3/1983 | Hara et al. |
| 4,391,674 A | 7/1983 | Velmin et al. |
| 4,392,824 A | 7/1983 | Struck et al. |
| 4,394,217 A | 7/1983 | Holz et al. |
| 4,395,269 A | 7/1983 | Schuler |
| 4,396,394 A | 8/1983 | Li et al. |
| 4,396,461 A | 8/1983 | Neubaum et al. |
| 4,407,237 A | 10/1983 | Merritt |
| 4,421,070 A | 12/1983 | Sullivan |
| 4,431,484 A | 2/1984 | Weber et al. |
| 4,439,277 A | 3/1984 | Dix |
| 4,440,098 A | 4/1984 | Adams |
| 4,445,977 A | 5/1984 | Husher |
| 4,446,018 A | 5/1984 | Cerwick |

(56) References Cited

U.S. PATENT DOCUMENTS

| | | |
|---|---|---|
| 4,448,541 A | 5/1984 | Lucas |
| 4,452,749 A | 6/1984 | Kolvek et al. |
| 4,459,103 A | 7/1984 | Gieskieng |
| 4,469,446 A | 9/1984 | Goodboy |
| 4,474,344 A | 10/1984 | Bennett |
| 4,487,137 A | 12/1984 | Horvat et al. |
| 4,498,786 A | 2/1985 | Ruscheweyh |
| 4,506,025 A | 3/1985 | Kleeb et al. |
| 4,508,539 A | 4/1985 | Nakai |
| 4,527,488 A | 7/1985 | Lindgren |
| 4,564,420 A | 1/1986 | Spindeler et al. |
| 4,568,426 A | 2/1986 | Orlando |
| 4,570,670 A | 2/1986 | Johnson |
| 4,614,567 A | 9/1986 | Stahlherm et al. |
| 4,643,327 A | 2/1987 | Campbell |
| 4,645,513 A | 2/1987 | Kubota et al. |
| 4,655,193 A | 4/1987 | Blacket |
| 4,655,804 A | 4/1987 | Kercheval et al. |
| 4,666,675 A | 5/1987 | Parker et al. |
| 4,680,167 A | 7/1987 | Orlando |
| 4,690,689 A | 9/1987 | Malcosky et al. |
| 4,704,195 A | 11/1987 | Janicka et al. |
| 4,720,262 A | 1/1988 | Durr et al. |
| 4,724,976 A | 2/1988 | Lee |
| 4,726,465 A | 2/1988 | Kwasnik et al. |
| 4,732,652 A | 3/1988 | Durselen et al. |
| 4,793,981 A | 12/1988 | Doyle et al. |
| 4,824,614 A | 4/1989 | Jones et al. |
| 4,889,698 A | 12/1989 | Moller et al. |
| 4,919,170 A | 4/1990 | Kallinich et al. |
| 4,929,179 A | 5/1990 | Breidenbach et al. |
| 4,941,824 A | 7/1990 | Holter et al. |
| 5,052,922 A | 10/1991 | Stokman et al. |
| 5,062,925 A | 11/1991 | Durselen et al. |
| 5,078,822 A | 1/1992 | Hodges et al. |
| 5,087,328 A | 2/1992 | Wegerer et al. |
| 5,114,542 A | 5/1992 | Childress et al. |
| 5,213,138 A | 5/1993 | Presz |
| 5,227,106 A | 7/1993 | Kolvek |
| 5,228,955 A | 7/1993 | Westbrook, III |
| 5,234,601 A | 8/1993 | Janke et al. |
| 5,318,671 A | 6/1994 | Pruitt |
| 5,370,218 A | 12/1994 | Johnson et al. |
| 5,423,152 A | 6/1995 | Kolvek |
| 5,447,606 A | 9/1995 | Pruitt |
| 5,480,594 A | 1/1996 | Wilkerson et al. |
| 5,542,650 A | 8/1996 | Abel et al. |
| 5,622,280 A | 4/1997 | Mays et al. |
| 5,659,110 A | 8/1997 | Herden et al. |
| 5,670,025 A | 9/1997 | Baird |
| 5,687,768 A | 11/1997 | Albrecht et al. |
| 5,715,962 A | 2/1998 | McDonnell |
| 5,752,548 A | 5/1998 | Matsumoto et al. |
| 5,787,821 A | 8/1998 | Bhat et al. |
| 5,810,032 A | 9/1998 | Hong et al. |
| 5,816,210 A | 10/1998 | Yamaguchi |
| 5,857,308 A | 1/1999 | Dismore et al. |
| 5,913,448 A | 6/1999 | Mann et al. |
| 5,928,476 A | 7/1999 | Daniels |
| 5,966,886 A | 10/1999 | Di Loreto |
| 5,968,320 A | 10/1999 | Sprague |
| 6,017,214 A | 1/2000 | Sturgulewski |
| 6,059,932 A | 5/2000 | Sturgulewski |
| 6,139,692 A | 10/2000 | Tamura et al. |
| 6,152,668 A | 11/2000 | Knoch |
| 6,187,148 B1 | 2/2001 | Sturgulewski |
| 6,189,819 B1 | 2/2001 | Racine |
| 6,290,494 B1 | 9/2001 | Barkdoll |
| 6,412,221 B1 | 7/2002 | Emsbo |
| 6,596,128 B2 | 7/2003 | Westbrook |
| 6,626,984 B1 | 9/2003 | Taylor |
| 6,699,035 B2 | 3/2004 | Brooker |
| 6,758,875 B2 | 7/2004 | Reid et al. |
| 6,907,895 B2 | 6/2005 | Johnson et al. |
| 6,946,011 B2 | 9/2005 | Snyder |
| 6,964,236 B2 | 11/2005 | Schucker |
| 7,056,390 B2 | 6/2006 | Fratello |
| 7,077,892 B2 | 7/2006 | Lee |
| 7,314,060 B2 | 1/2008 | Chen et al. |
| 7,331,298 B2 | 2/2008 | Barkdoll et al. |
| 7,433,743 B2 | 10/2008 | Pistikopoulos et al. |
| 7,497,930 B2 | 3/2009 | Barkdoll et al. |
| 7,611,609 B1 | 11/2009 | Valia et al. |
| 7,644,711 B2 | 1/2010 | Creel |
| 7,722,843 B1 | 5/2010 | Srinivasachar |
| 7,727,307 B2 | 6/2010 | Winkler |
| 7,785,447 B2 | 8/2010 | Eatough et al. |
| 7,803,627 B2 | 9/2010 | Hodges et al. |
| 7,823,401 B2 | 11/2010 | Takeuchi et al. |
| 7,827,689 B2 | 11/2010 | Crane |
| 7,998,316 B2 | 8/2011 | Barkdoll |
| 8,071,060 B2 | 12/2011 | Ukai et al. |
| 8,079,751 B2 | 12/2011 | Kapila et al. |
| 8,080,088 B1 | 12/2011 | Srinivasachar |
| 8,146,376 B1 | 4/2012 | Williams et al. |
| 8,152,970 B2 | 4/2012 | Barkdoll et al. |
| 8,236,142 B2 | 8/2012 | Westbrook |
| 8,266,853 B2 | 9/2012 | Bloom et al. |
| 8,398,935 B2 | 3/2013 | Howell et al. |
| 8,409,405 B2 | 4/2013 | Kim et al. |
| 8,500,881 B2 | 8/2013 | Orita et al. |
| 8,515,508 B2 | 8/2013 | Kawamura et al. |
| 8,647,476 B2 | 2/2014 | Kim et al. |
| 8,800,795 B2 | 8/2014 | Hwang |
| 8,956,995 B2 | 2/2015 | Masatsugu et al. |
| 8,980,063 B2 | 3/2015 | Kim et al. |
| 9,039,869 B2 | 5/2015 | Kim et al. |
| 9,057,023 B2 | 6/2015 | Reichelt et al. |
| 9,103,234 B2 | 8/2015 | Gu et al. |
| 9,193,915 B2 | 11/2015 | West et al. |
| 9,238,778 B2 | 1/2016 | Quanci et al. |
| 9,243,186 B2 | 1/2016 | Quanci et al. |
| 9,249,357 B2 | 2/2016 | Quanci et al. |
| 9,273,249 B2 | 3/2016 | Quanci et al. |
| 9,359,554 B2 | 6/2016 | Quanci et al. |
| 9,404,043 B2 | 8/2016 | Kim |
| 9,498,786 B2 | 11/2016 | Pearson |
| 10,047,295 B2 | 8/2018 | Chun et al. |
| 10,323,192 B2 | 6/2019 | Quanci et al. |
| 10,578,521 B1 | 3/2020 | Dinakaran et al. |
| 10,732,621 B2 | 8/2020 | Cella et al. |
| 2002/0170605 A1 | 11/2002 | Shiraishi et al. |
| 2003/0014954 A1 | 1/2003 | Ronning et al. |
| 2003/0015809 A1 | 1/2003 | Carson |
| 2003/0057083 A1 | 3/2003 | Eatough et al. |
| 2005/0087767 A1 | 4/2005 | Fitzgerald et al. |
| 2006/0029532 A1* | 2/2006 | Breen .................. B01D 53/64 423/210 |
| 2006/0102420 A1 | 5/2006 | Huber et al. |
| 2006/0149407 A1 | 7/2006 | Markham et al. |
| 2007/0087946 A1 | 4/2007 | Quest et al. |
| 2007/0116619 A1 | 5/2007 | Taylor et al. |
| 2007/0251198 A1 | 11/2007 | Witter |
| 2008/0028935 A1 | 2/2008 | Andersson |
| 2008/0179165 A1 | 7/2008 | Chen et al. |
| 2008/0257236 A1 | 10/2008 | Green |
| 2008/0271985 A1 | 11/2008 | Yamasaki |
| 2008/0289305 A1 | 11/2008 | Girondi |
| 2009/0007785 A1 | 1/2009 | Kimura et al. |
| 2009/0032385 A1 | 2/2009 | Engle |
| 2009/0152092 A1 | 6/2009 | Kim et al. |
| 2009/0162269 A1 | 6/2009 | Barger et al. |
| 2009/0217576 A1 | 9/2009 | Kim et al. |
| 2009/0257932 A1 | 10/2009 | Canari et al. |
| 2009/0283395 A1 | 11/2009 | Hippe |
| 2010/0095521 A1 | 4/2010 | Kartal et al. |
| 2010/0106310 A1 | 4/2010 | Grohman |
| 2010/0113266 A1 | 5/2010 | Abe et al. |
| 2010/0115912 A1 | 5/2010 | Worley |
| 2010/0119425 A1 | 5/2010 | Palmer |
| 2010/0181297 A1 | 7/2010 | Whysail |
| 2010/0196597 A1 | 8/2010 | Di Loreto |
| 2010/0276269 A1 | 11/2010 | Schuecker et al. |
| 2010/0287871 A1 | 11/2010 | Bloom et al. |

(56) References Cited

U.S. PATENT DOCUMENTS

| | | |
|---|---|---|
| 2010/0300867 A1 | 12/2010 | Kim et al. |
| 2010/0314234 A1 | 12/2010 | Knoch et al. |
| 2011/0000284 A1 | 1/2011 | Kumar et al. |
| 2011/0014406 A1 | 1/2011 | Coleman et al. |
| 2011/0048917 A1 | 3/2011 | Kim et al. |
| 2011/0088600 A1 | 4/2011 | McRae |
| 2011/0120852 A1 | 5/2011 | Kim |
| 2011/0144406 A1 | 6/2011 | Masatsugu et al. |
| 2011/0168482 A1 | 7/2011 | Merchant et al. |
| 2011/0174301 A1 | 7/2011 | Haydock et al. |
| 2011/0192395 A1 | 8/2011 | Kim |
| 2011/0198206 A1 | 8/2011 | Kim et al. |
| 2011/0223088 A1 | 9/2011 | Chang et al. |
| 2011/0253521 A1 | 10/2011 | Kim |
| 2011/0291827 A1 | 12/2011 | Baldocchi et al. |
| 2011/0313218 A1 | 12/2011 | Dana |
| 2011/0315538 A1 | 12/2011 | Kim et al. |
| 2012/0024688 A1 | 2/2012 | Barkdoll |
| 2012/0030998 A1 | 2/2012 | Barkdoll et al. |
| 2012/0031076 A1 | 2/2012 | Frank et al. |
| 2012/0125709 A1 | 5/2012 | Merchant et al. |
| 2012/0152720 A1 | 6/2012 | Reichelt et al. |
| 2012/0177541 A1 | 7/2012 | Mutsuda et al. |
| 2012/0180133 A1 | 7/2012 | Al-Harbi et al. |
| 2012/0228115 A1 | 9/2012 | Westbrook |
| 2012/0247939 A1 | 10/2012 | Kim et al. |
| 2012/0305380 A1 | 12/2012 | Wang et al. |
| 2012/0312019 A1 | 12/2012 | Rechtman |
| 2013/0020781 A1 | 1/2013 | Kishikawa |
| 2013/0045149 A1 | 2/2013 | Miller |
| 2013/0216717 A1 | 8/2013 | Rago et al. |
| 2013/0220373 A1 | 8/2013 | Kim |
| 2013/0306462 A1 | 11/2013 | Kim et al. |
| 2014/0033917 A1 | 2/2014 | Rodgers et al. |
| 2014/0039833 A1 | 2/2014 | Sharpe, Jr. et al. |
| 2014/0061018 A1 | 3/2014 | Sarpen et al. |
| 2014/0083836 A1 | 3/2014 | Quanci et al. |
| 2014/0182195 A1 | 7/2014 | Quanci et al. |
| 2014/0182683 A1 | 7/2014 | Quanci et al. |
| 2014/0183023 A1 | 7/2014 | Quanci et al. |
| 2014/0183024 A1 | 7/2014 | Chun et al. |
| 2014/0208997 A1 | 7/2014 | Alferyev et al. |
| 2014/0224123 A1 | 8/2014 | Walters |
| 2014/0262139 A1 | 9/2014 | Choi et al. |
| 2014/0262726 A1 | 9/2014 | West et al. |
| 2015/0122629 A1 | 5/2015 | Freimuth et al. |
| 2015/0175433 A1 | 6/2015 | Micka et al. |
| 2015/0219530 A1 | 8/2015 | Li et al. |
| 2015/0247092 A1 | 9/2015 | Quanci et al. |
| 2015/0328576 A1 | 9/2015 | Quanci et al. |
| 2015/0287026 A1 | 10/2015 | Quanci et al. |
| 2015/0361346 A1 | 12/2015 | West et al. |
| 2015/0361347 A1 | 12/2015 | Ball et al. |
| 2016/0026193 A1 | 1/2016 | Rhodes et al. |
| 2016/0032193 A1 | 2/2016 | Sarpen et al. |
| 2016/0048139 A1 | 2/2016 | Samples et al. |
| 2016/0060532 A1 | 3/2016 | Quanci et al. |
| 2016/0060533 A1 | 3/2016 | Quanci et al. |
| 2016/0060534 A1 | 3/2016 | Quanci et al. |
| 2016/0060536 A1 | 3/2016 | Quanci et al. |
| 2016/0149944 A1 | 5/2016 | Obermeier et al. |
| 2016/0152897 A1 | 6/2016 | Quanci et al. |
| 2016/0154171 A1 | 6/2016 | Kato et al. |
| 2016/0160123 A1 | 6/2016 | Quanci et al. |
| 2016/0186063 A1 | 6/2016 | Quanci et al. |
| 2016/0186064 A1 | 6/2016 | Quanci et al. |
| 2016/0186065 A1 | 6/2016 | Quanci et al. |
| 2016/0222297 A1 | 8/2016 | Choi et al. |
| 2016/0319197 A1 | 11/2016 | Quanci et al. |
| 2016/0319198 A1 | 11/2016 | Quanci et al. |
| 2017/0015908 A1 | 1/2017 | Quanci et al. |
| 2017/0137714 A1 | 5/2017 | West et al. |
| 2017/0182447 A1 | 6/2017 | Sappok et al. |
| 2017/0183569 A1 | 6/2017 | Quanci et al. |
| 2017/0253803 A1 | 9/2017 | West et al. |
| 2017/0253804 A1 | 9/2017 | Quanci et al. |
| 2017/0261417 A1 | 9/2017 | Zhang |
| 2017/0352243 A1 | 12/2017 | Quanci et al. |
| 2019/0317167 A1 | 10/2019 | LaBorde et al. |
| 2020/0071190 A1 | 3/2020 | Wiederin et al. |
| 2020/0139273 A1 | 5/2020 | Badiei |
| 2020/0173679 A1 | 6/2020 | O'Reilly et al. |

FOREIGN PATENT DOCUMENTS

| | | |
|---|---|---|
| CA | 2822841 | 7/2012 |
| CA | 2822857 | 7/2012 |
| CN | 87212113 U | 6/1988 |
| CN | 87107195 A | 7/1988 |
| CN | 2064363 U | 10/1990 |
| CN | 2139121 Y | 7/1993 |
| CN | 1092457 A | 9/1994 |
| CN | 1255528 A | 6/2000 |
| CN | 1270983 A | 10/2000 |
| CN | 2528771 Y | 2/2002 |
| CN | 1358822 A | 7/2002 |
| CN | 2521473 Y | 11/2002 |
| CN | 1468364 A | 1/2004 |
| CN | 1527872 A | 9/2004 |
| CN | 2668641 | 1/2005 |
| CN | 1957204 A | 5/2007 |
| CN | 101037603 A | 9/2007 |
| CN | 101058731 A | 10/2007 |
| CN | 101157874 A | 4/2008 |
| CN | 201121178 Y | 9/2008 |
| CN | 101395248 A | 3/2009 |
| CN | 100510004 C | 7/2009 |
| CN | 101486017 A | 7/2009 |
| CN | 201264981 Y | 7/2009 |
| CN | 101497835 A | 8/2009 |
| CN | 101509427 A | 8/2009 |
| CN | 101886466 A | 11/2010 |
| CN | 102155300 A | 8/2011 |
| CN | 2509188 Y | 11/2011 |
| CN | 202226816 | 5/2012 |
| CN | 202265541 U | 6/2012 |
| CN | 102584294 A | 7/2012 |
| CN | 202415446 U | 9/2012 |
| CN | 103468289 A | 12/2013 |
| CN | 203981700 U | 12/2014 |
| CN | 105189704 A | 12/2015 |
| CN | 106661456 A | 5/2017 |
| CN | 107445633 A | 12/2017 |
| CN | 100500619 C | 6/2020 |
| DE | 201729 C | 9/1908 |
| DE | 212176 | 7/1909 |
| DE | 1212037 B | 3/1966 |
| DE | 3231697 C1 | 1/1984 |
| DE | 3328702 A1 | 2/1984 |
| DE | 3315738 C2 | 3/1984 |
| DE | 3329367 C | 11/1984 |
| DE | 3407487 C1 | 6/1985 |
| DE | 19545736 | 6/1997 |
| DE | 19803455 | 8/1999 |
| DE | 10122531 A1 | 11/2002 |
| DE | 10154785 | 5/2003 |
| DE | 102005015301 | 10/2006 |
| DE | 102006004669 | 8/2007 |
| DE | 102006026521 | 12/2007 |
| DE | 102009031436 | 1/2011 |
| DE | 102011052785 | 12/2012 |
| EP | 0126399 A1 | 11/1984 |
| EP | 0208490 | 1/1987 |
| EP | 0903393 A2 | 3/1999 |
| EP | 1538503 A1 | 6/2005 |
| EP | 2295129 | 3/2011 |
| EP | 2468837 A1 | 6/2012 |
| FR | 2339664 | 8/1977 |
| GB | 364236 A | 1/1932 |
| GB | 368649 A | 3/1932 |
| GB | 441784 | 1/1936 |
| GB | 606340 | 8/1948 |
| GB | 611524 | 11/1948 |
| GB | 725865 | 3/1955 |

(56) References Cited

FOREIGN PATENT DOCUMENTS

| | | |
|---|---|---|
| GB | 871094 | 6/1961 |
| GB | 923205 A | 5/1963 |
| JP | S50148405 | 12/1975 |
| JP | S59019301 | 2/1978 |
| JP | 54054101 | 4/1979 |
| JP | S5453103 A | 4/1979 |
| JP | 57051786 | 3/1982 |
| JP | 57051787 | 3/1982 |
| JP | 57083585 | 5/1982 |
| JP | 57090092 | 6/1982 |
| JP | S57172978 A | 10/1982 |
| JP | 58091788 | 5/1983 |
| JP | 59051978 | 3/1984 |
| JP | 59053589 | 3/1984 |
| JP | 59071388 | 4/1984 |
| JP | 59108083 | 6/1984 |
| JP | 59145281 | 8/1984 |
| JP | 60004588 | 1/1985 |
| JP | 61106690 | 5/1986 |
| JP | 62011794 | 1/1987 |
| JP | 62285980 | 12/1987 |
| JP | 01103694 | 4/1989 |
| JP | 01249886 | 10/1989 |
| JP | H0319127 | 3/1991 |
| JP | 03197588 | 8/1991 |
| JP | 04159392 | 6/1992 |
| JP | H04178494 A | 6/1992 |
| JP | H05230466 A | 9/1993 |
| JP | H0649450 A | 2/1994 |
| JP | H0654753 U | 7/1994 |
| JP | H06264062 | 9/1994 |
| JP | H06299156 A | 10/1994 |
| JP | 07188668 | 7/1995 |
| JP | 07216357 | 8/1995 |
| JP | H07204432 | 8/1995 |
| JP | 08104875 A | 4/1996 |
| JP | 08127778 | 5/1996 |
| JP | H10273672 A | 10/1998 |
| JP | H11-131074 | 5/1999 |
| JP | 2000204373 A | 7/2000 |
| JP | 2000219883 A | 8/2000 |
| JP | 2001055576 A | 2/2001 |
| JP | 2001200258 | 7/2001 |
| JP | 2002097472 A | 4/2002 |
| JP | 2002106941 | 4/2002 |
| JP | 2003041258 | 2/2003 |
| JP | 2003071313 | 3/2003 |
| JP | 2003292968 A | 10/2003 |
| JP | 2003342581 A | 12/2003 |
| JP | 2005503448 A | 2/2005 |
| JP | 2005154597 A | 6/2005 |
| JP | 2005263983 A | 9/2005 |
| JP | 2005344085 A | 12/2005 |
| JP | 2006188608 A | 7/2006 |
| JP | 2007063420 A | 3/2007 |
| JP | 4101226 B2 | 6/2008 |
| JP | 2008231278 A | 10/2008 |
| JP | 2009019106 A | 1/2009 |
| JP | 2009073864 A | 4/2009 |
| JP | 2009073865 A | 4/2009 |
| JP | 2009144121 | 7/2009 |
| JP | 2010229239 A | 10/2010 |
| JP | 20100248389 A | 11/2010 |
| JP | 2011504947 A | 2/2011 |
| JP | 2011068733 A | 4/2011 |
| JP | 2011102351 A | 5/2011 |
| JP | 2012102302 | 5/2012 |
| JP | 2013006957 A | 1/2013 |
| JP | 2013510910 | 3/2013 |
| JP | 2013189322 A | 9/2013 |
| JP | 20140404502 A | 3/2014 |
| JP | 2015094091 A | 5/2015 |
| JP | 2016169897 A | 9/2016 |
| KR | 1019960008754 | 10/1996 |
| KR | 19990017156 U | 5/1999 |
| KR | 1019990054426 | 7/1999 |
| KR | 20000042375 A | 7/2000 |
| KR | 100296700 B1 | 10/2001 |
| KR | 20030012458 A | 2/2003 |
| KR | 1020050053861 A | 6/2005 |
| KR | 20060132336 A | 12/2006 |
| KR | 100737393 B1 | 7/2007 |
| KR | 100797852 | 1/2008 |
| KR | 20080069170 A | 7/2008 |
| KR | 20110010452 A | 2/2011 |
| KR | 101314288 | 4/2011 |
| KR | 20120033091 A | 4/2012 |
| KR | 20130050807 | 5/2013 |
| KR | 101318388 | 10/2013 |
| KR | 20140042526 A | 4/2014 |
| KR | 20150011084 A | 1/2015 |
| KR | 20170038102 A | 4/2017 |
| KR | 20170058808 A | 5/2017 |
| KR | 101862491 B1 | 5/2018 |
| RU | 2083532 C1 | 7/1997 |
| RU | 2441898 C2 | 2/2012 |
| RU | 2493233 C2 | 9/2013 |
| SU | 1535880 A1 | 1/1990 |
| TW | 201241166 A1 | 10/2012 |
| TW | 201245431 A1 | 11/2012 |
| UA | 50580 | 10/2002 |
| WO | WO9012074 | 10/1990 |
| WO | WO9945083 | 9/1999 |
| WO | WO02062922 | 8/2002 |
| WO | WO2005023649 | 3/2005 |
| WO | WO2005115583 | 12/2005 |
| WO | WO2007103649 | 9/2007 |
| WO | WO2008034424 | 3/2008 |
| WO | WO2011000447 | 1/2011 |
| WO | WO2011126043 | 10/2011 |
| WO | WO2012029979 | 3/2012 |
| WO | WO2012031726 | 3/2012 |
| WO | WO2013023872 | 2/2013 |
| WO | WO2010107513 | 9/2013 |
| WO | WO2014021909 | 2/2014 |
| WO | WO2014043667 | 3/2014 |
| WO | WO2014105064 | 7/2014 |
| WO | WO2014153050 | 9/2014 |
| WO | WO2016004106 | 1/2016 |
| WO | WO2016033511 | 3/2016 |

OTHER PUBLICATIONS

Canadian Office Action in Canadian Application No. 2,896,475; dated Feb. 6, 2019; 4 pages.
Astrom, et al., "Feedback Systems: An Introduction for Scientists and Engineers," Sep. 16, 2006, available on line at http://people/duke.edu/-hpgavin/SystemID/References/Astrom-Feedback-2006.pdf ; 404 pages.
Industrial Furnace Design Handbook, Editor-in-Chief: First Design Institute of First Ministry of Machinery Industry, Beijing: Mechanical Industry Press, pp. 180-183, Oct. 1981.
"What is dead-band control," forum post by user "wireaddict" on AllAboutCircuits.com message board, Feb. 8, 2007, accessed Oct. 24, 2018 at https://forum.allaboutcircuits.com/threads/what-is-dead-band-control.4728/; 8 pages.
India First Examination Report in Application No. 1983/KOLNP/2015; dated Oct. 29, 2018; 7 pages.
U.S. Appl. No. 16/428,014, filed May 31, 2019, Quanci et al.
U.S. Appl. No. 16/026,363, filed Jul. 3, 2018, Chun et al.
U.S. Appl. No. 16/047,198, filed Jul. 27, 2018, Quanci et al.
U.S. Appl. No. 16/828,448, filed Mar. 24, 2020, Quanci et al.
U.S. Appl. No. 16/845,530, filed Apr. 10, 2020, Quanci et al.
U.S. Appl. No. 16/897,957, filed Jun. 10, 2020, Ball et al.
U.S. Appl. No. 17/076,563, filed Oct. 21, 2020, Crum et al.
Brazilian Examination Report for Brazilian Application No. BR112015015667-3; dated Oct. 23, 2020; 10 pages.
U.S. Appl. No. 16/704,689, filed Dec. 5, 2019, West et al.
U.S. Appl. No. 16/729,036, filed Dec. 27, 2019, Quanci et at.
U.S. Appl. No. 16/729,053, filed Dec. 27, 2019, Quanci et at.
U.S. Appl. No. 16/729,057, filed Dec. 27, 2019, Quanci et at.

(56) References Cited

OTHER PUBLICATIONS

U.S. Appl. No. 16/729,068, filed Dec. 27, 2019, Quanci et at.
U.S. Appl. No. 16/729,122, filed Dec. 27, 2019, Quanci et at.
U.S. Appl. No. 16/729,129, filed Dec. 27, 2019, Quanci et at.
U.S. Appl. No. 16/729,157, filed Dec. 27, 2019, Quanci et at.
U.S. Appl. No. 16/729,170, filed Dec. 27, 2019, Quanci et at.
U.S. Appl. No. 16/729,201, filed Dec. 27, 2019, Quanci et at.
U.S. Appl. No. 16/729,212, filed Dec. 27, 2019, Quanci et at.
U.S. Appl. No. 16/729,219, filed Dec. 27, 2019, Quanci et at.
U.S. Appl. No. 16/735,103, filed Jan. 6, 2020, Quanci et al.
Joseph, B., "A tutorial on inferential control and its applications," Proceedings of the 1999 American Control Conference (Cat. No. 99CH36251), San Diego, CA, 1999, pp. 3106-3118 vol. 5.
U.S. Appl. No. 15/987,860, filed May 23, 2018, Crum et al.
ASTM D5341-99(2010)e1, Standard Test Method for Measuring Coke Reactivity Index (CRI) and Coke Strength After Reaction (CSR), ASTM International, West Conshohocken, PA, 2010.
Basset et al., "Calculation of steady flow pressure loss coefficients for pipe junctions," Proc Instn Mech Engrs., vol. 215, Part C. IMechIE 2001.
Beckman et al., "Possibilities and limits of cutting back coking plant output," Stahl Und Eisen, Verlag Stahleisen, Dusseldorf, DE, vol. 130, No. 8, Aug. 16, 2010, pp. 57-67.
Bloom, et al., "Modular cast block—The future of coke oven repairs," Iron & Steel Technol, AIST, Warrendale, PA, vol. 4, No. 3, Mar. 1, 2007, pp. 61-64.
Boyes, Walt. (2003), Instrumentation Reference Book (3rd Edition)—34.7.4.6 Infrared and Thermal Cameras, Elsevier. Online version available at: https://app.knovel.com/hotlink/pdf/id:kt004QMGV6/instrumentation-reference-2/ditigal-video.
Clean coke process: process development studies by USS Engineers and Consultants, Inc., Wisconsin Tech Search, request date Oct. 5, 2011, 17 pages.
"Conveyor Chain Designer Guild", Mar. 27, 2014 (date obtained from wayback machine), Renold.com, Section 4, available online at: http://www.renold/com/upload/renoldswitzerland/conveyor_chain_-_designer_guide.pdf.
Costa, et al., "Edge Effects on the Flow Characteristics in a 90 deg Tee Junction," Transactions of the ASME, Nov. 2006, vol. 128, pp. 1204-1217.
Crelling, et al., "Effects of Weathered Coal on Coking Properties and Coke Quality", Fuel, 1979, vol. 58, Issue 7, pp. 542-546.
Database WPI, Week 199115, Thomson Scientific, Lond, GB; AN 1991-107552.
Diez, et al., "Coal for Metallurgical Coke Production: Predictions of Coke Quality and Future Requirements for Cokemaking", International Journal of Coal Geology, 2002, vol. 50, Issue 1-4, pp. 389-412.
JP 03-197588, Inoue Keizo et al., Method and Equipment for Boring Degassing Hole in Coal Charge in Coke Oven, Japanese Patent (Abstract Only) Aug. 28, 1991.
JP 04-159392, Inoue Keizo et al., Method and Equipment for Opening Hole for Degassing of Coal Charge in Coke Oven, Japanese Patent (Abstract Only) Jun. 2, 1992.
Kerlin, Thomas (1999), Practical Thermocouple Thermometry—1.1 The Thermocouple. ISA. Online version available at https:app.knovel.com/pdf/id:kt007XPTM3/practical-thermocouple/the-thermocouple.

Kochanski et al., "Overview of Uhde Heat Recovery Cokemaking Technology," AISTech Iron and Steel Technology Conference Proceedings, Association for Iron and Steel Technology, U.S., vol. 1, Jan. 1, 2005, pp. 25-32.
Practical Technical Manual of Refractories, Baoyu Hu, etc., Beijing: Metallurgical Industry Press, Chapter 6; 2004, 6-30.
Refractories for Ironmaking and Steelmaking: A History of Battles over High Temperatures; Kyoshi Sugita (Japan, Shaolin Zhang), 1995, p. 160, 2004, 2-29.
Rose, Harold J., "The Selection of Coals for the Manufacture of Coke," American Institute of Mining and Metallurgical Engineers, Feb. 1926, 8 pages.
Madias, et al., "A review on stamped charging of coals" (2013). Available at https://www.researchgate.net/publicatoin/263887759_A_review_on_stamped_charging_of_coals.
Metallurgical Code MSDS, ArcelorMittal, May 30, 2011, available online at http://dofasco.arcelormittal.com/-/media/Files/A/Arcelormittal-Canada/material-safety/metallurgical-coke.pdf.
"Middletown Coke Company HRSG Maintenance BACT Analysis Option 1—Individual Spray Quenches Sun Heat Recovery Coke Facility Process Flow Diagram Middletown Coke Company 100 Oven Case #1-24.5 VM", (Sep. 1, 2009), URL: http://web.archive.org/web/20090901042738/http://epa.ohio.gov/portals/27/transfer/ptiApplication/mcc/new/262504.pdf, (Feb. 12, 2016), XP055249803 [X] 1-13 * p. 7 * * pp. 8-11 *.
Waddell, et al., "Heat-Recovery Cokemaking Presentation," Jan. 1999, pp. 1-25.
Walker D N et al, "Sun Coke Company's heat recovery cokemaking technology high coke quality and low environmental impact", Revue De Metallurgie—Cahiers D'Informations Techniques, Revue De Metallurgie. Paris, FR, (Mar. 1, 2003), vol. 100, No. 3, ISSN 0035-1563, p. 23.
Westbrook, "Heat-Recovery Cokemaking at Sun Coke," Aise Steel Technology, Pittsburg, PA, vol. 76, No. 1, Jan. 1999, pp. 25-28.
Yu et al., "Coke Oven Production Technology," Lianoning Science and Technology Press, first edition, Apr. 2014, pp. 356-358.
"Resources and Utilization of Coking Coal in China," Mingxin Shen ed., Chemical Industry Press, first edition, Jan. 2007, pp. 242-243, 247.
Chinese Office Action in Chinese Application No. 201280078103.9, dated Jun. 14, 2016.
Chinese Office Action in Chinese Application No. 201280078103.9, dated Jan. 17, 2017.
Chinese Office Action in Chinese Application No. 201280078103.9; dated Sep. 1, 2017.
Extended European Search Report in European Appliation No. 128911542, dated Jul. 13, 2016, 7 pages.
International Search Report and Written Opinion of International Application No. PCT/US2012/072167; dated Sep. 24, 2013; 12 pages.
Knoerzer et al. "Jewell-Thompson Non-Recovery Cokemaking", Steel Times, Fuel & Metallurgical Journals Ltd. London, GB, vol. 221, No. 4, Apr. 1, 1993, pp. 172-173,184.
Brazilian Examination Report for Brazilian Application No. BR112015015667-3; dated Sep. 3, 2019; 8 pages.

* cited by examiner

SYSTEMS AND METHODS FOR REMOVING MERCURY FROM EMISSIONS

TECHNICAL FIELD

The present technology is generally directed to systems and methods for removing mercury from emissions. More specifically, some embodiments are directed to systems and methods for removing mercury from exhaust gas in a flue gas desulfurization system.

BACKGROUND

Many industrial processes utilize emissions treatment systems to reduce the dissemination of various pollutants. Mercury, for example, is considered to be a toxic pollutant and its containment is heavily regulated. One of the most effective methods for removing pollutants such as mercury from industrial emissions is a treatment using activated carbon.

Activated carbon is a form of carbon processed to be riddled with small, low-volume pores that increase the surface area available for adsorption or chemical reactions. Powder activated carbon (PAC) is a particulate form of activated carbon, typically having fine granules less than 1.0 mm in size with an average diameter between 0.15 and 0.25 mm. PAC thus has a large surface to volume ratio with a small diffusion distance. In mercury treatment systems, PAC can adsorb vaporized mercury from flue gas and then be collected with fly ash in the treatment facility's particulate collection device, such as a bag house. However, PAC is somewhat hydrophilic and can compete for moisture with other compounds in an emissions treatment system.

For example, lime is used to remove acidic gases, particularly sulfur dioxide, from flue gases. In dry lime scrubbing treatments, lime is injected directly into flue gas to remove sulfur dioxide. A sulfur dioxide and lime contact zone, such as a spray dryer, provides space for mixing hot flue gas and lime slurry that is sprayed through an atomizer or nozzle. The lime slurry absorbs sulfur dioxide. The water in the lime slurry is then evaporated by the hot gas. A portion of the dried, unreacted lime and its reaction products fall to the bottom of the contact zone and are removed. The flue gas then flows to a particulate control device (e.g., the bag house) to remove the remainder of the lime and reaction products.

Because of PAC's moisture-competitive quality, emissions treatment systems utilizing both PAC and lime slurry may require significantly more lime slurry to adequately remove sulfur dioxide as compared to systems not using PAC. Accordingly, there exists a need to improve the efficient control and treatment of pollutants such as mercury and sulfur dioxide within a single system.

DETAILED DESCRIPTION

The present technology is generally directed to systems and methods for removing mercury from emissions. More specifically, some embodiments are directed to systems and methods for removing mercury from exhaust gas in a flue gas desulfurization system. In one embodiment, a method of removing mercury from exhaust gas in a flue gas desulfurization system includes inletting the gas into a housing and conditioning an additive. In some embodiments, conditioning the additive comprises hydrating powder-activated carbon. The method further includes introducing the conditioned additive into the housing and capturing mercury from the gas.

Specific details of several embodiments of the technology are described below with reference to FIGS. 1-6. Other details describing well-known structures and systems often associated with emissions handling and/or coal processing have not been set forth in the following disclosure to avoid unnecessarily obscuring the description of the various embodiments of the technology. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1-6.

Figure 1:
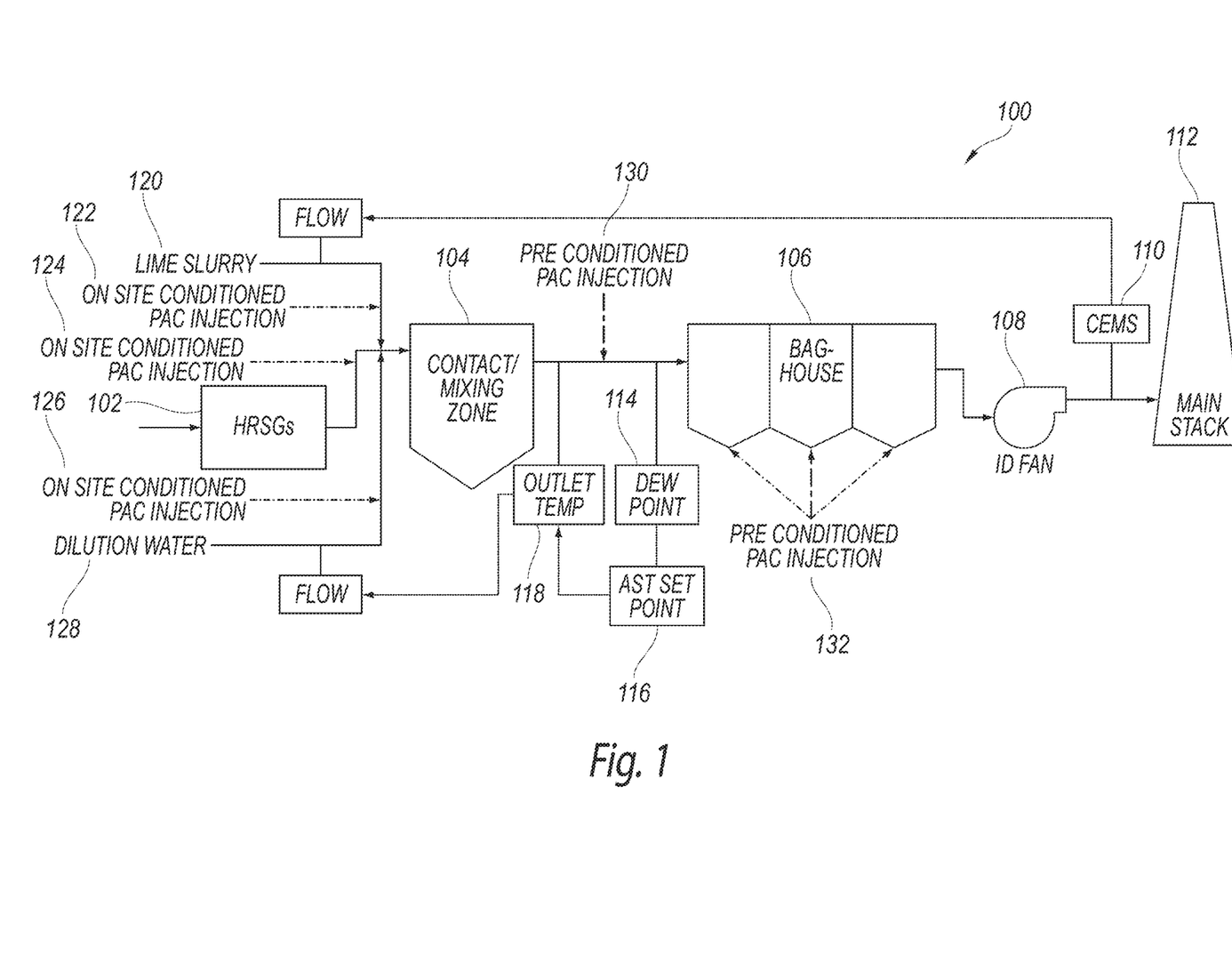
FIG. 1 is a schematic illustration of an emissions handling system configured in accordance with embodiments of the technology.

FIG. 1 is a schematic illustration of an emissions handling system 100 configured in accordance with embodiments of the technology. In several embodiments, the system 100 is an air pollution control system configured to handle, process, or contain emissions from a coal processing system, such as coke oven flue gases from a heat recovery plant. In the illustrated embodiment, for example, the emissions can pass from a heat recovery steam generator, or HRSG, 102. The emissions can initially contain various pollutants such as mercury. In further embodiments, the emissions can be generated in another mineral processing system, a power plant, a trash to steam plant, a carbon alloy processing system, a dry sulfur removal system, a hot ash circulator, or other similar system.

In some embodiments, the emissions pass from the HRSG 102 to a contact/mixing zone 104. The contact zone 104 can comprise any type of flow passageway or scrubber used to remove particulate and/or gases from the emissions. In some embodiments, the contact/mixing zone 104 comprises one or more of a riser, flow passageway, sulfur dioxide removal vessel, lime introduction vessel, Spray Dry Absorber (SDA), Circulating Fluidized Bed (CFB), Circulating Dry Scrubber (CDS), Gas Suspension Absorber (GSA), Dry Flue Gas Desulphurization (DFGD) System, or Enhanced All Dry Scrubber (EAD).

Upon exiting the contact zone 104, the emissions can pass to a bag house 106, fabric filter, or similar air pollution control device. In some embodiments, the emissions pass through a cyclone and/or electrostatic precipitator prior to entering the bag house 106. Upon exiting the bag house 106, the emissions can be pulled by an induced draft (ID) fan 108 and evaluated by a Continuous Emissions Monitoring System (CEMS) 110 and/or exit to the atmosphere via a main stack 112. In various embodiments, the CEMS 110 can monitor levels of mercury, sulfur dioxide, nitrogen oxides, carbon monoxide, carbon dioxide, hydrogen chloride, airborne particulate matter, volatile organic compounds, oxygen, and/or other parameter. The CEMS 110 can include a sensor and emissions pathway redirection mechanism configured to redirect the emissions back through the contact zone if a sensed parameter doesn't satisfy a desired emissions level. In further embodiments, the system 100 can include additional or alternate sensors further upstream or downstream in the emissions pathway. For example, in some embodiments, tests for other factors such as dew point 114, Approach to Saturation Temperature (AST) set point 116, outlet temperature 118, pressure, water partial pressure, mercury level, or other factor can be made along the emissions pathway. These testing points can be at other locations in the system 100 than those illustrated in FIG. 1. For example, in other embodiments, set point 116 is measured at the outlet of the contact/mixing zone 104 or the bag house 106. The level of any of these or other parameters can be adjusted to optimize pollutant removal while maintaining system functionality and throughput. In still further embodiments, the system 100 can redirect the emissions to an upstream point for further cleaning depending on a parameter reading.

In several embodiments, the system 100 can include one or more entry points for a conditioned additive. The additive can be selected to capture and/or oxidize mercury or otherwise treat other particulate in the emissions stream. In several embodiments, for example, the additive comprises non-brominated or brominated PAC. In further embodiments, the additive can comprise non-PAC carbon-based materials, promoted PAC, modified PAC, hydrogen bromide, dry absorbents, amended silicate, anhydrous hydrophilic materials, or other suitable materials. PAC can be considered a hydrophobic material having slight hydrophilicity; in some embodiments, other materials having similar characteristics can be used.

As will be described in further detail below, conditioning the additive can comprise various procedures that alter the behavior of the additive toward the emissions. For example, the conditioning can comprise hydrating the additive (e.g., with water or other substance), applying steam or heat to the additive, hydrating and then drying the additive, introducing the additive into a slurry, or other steps. The additive can be conditioned on site (e.g., during introduction or within an emissions housing, bag house or pathway) or can be conditioned prior to introduction. In a particular embodiment, the additive is conditioned immediately prior to introduction to the bag house 106. In some embodiments, the additive can be conditioned in situ and the conditioning agent can be preferential to the additive over other substances in the vicinity. In some embodiments, the additive can be selected and/or conditioned to control the moisture of fly ash in the bag house 106. For example, non-conditioned, dry PAC would be moisture-preferential in the bag house 106. However, by conditioning PAC additive through hydration, there can be sufficient moisture remaining in the fly ash to ensure sulfur dioxide removal by the lime. In some embodiments, the fly ash moisture content can be kept between about 1% and 7%, and the additive can be conditioned (i.e., hydrated) accordingly to achieve this level. In other embodiments, the fly ash can be hydrated or otherwise conditioned, which makes it less susceptible to the PAC removing moisture. In some embodiments, the fly ash moisture content can be affected by the means/timing of additive conditioning. In some embodiments, the additive is introduced with a carrier. In still further embodiments, the additive is combined with a surfactant to keep the additive in suspension.

In operation, the additive can be introduced at one or more different points along the emissions pathway in the system 100. These various additive introduction points are illustrated in broken line in FIG. 1. In further embodiments, the additive can be introduced at multiple locations in the emissions pathway, either simultaneously or selectively. In some embodiments, the additive is introduced at point 122 in conjunction with a treatment substance such as lime slurry 120. As discussed above, the lime slurry 120 can be introduced to the emissions (for example, via an atomizer, throat, or nozzle) to remove sulfur dioxide from the emissions. In further embodiments, the additive can be introduced to the emissions pathway separately from the lime slurry injection (either upstream or downstream, such as at introduction point 124). In still further embodiments, the additive can be introduced via a supply line at point 126 in conjunction with a dilution material, such as dilution water 128. In yet another embodiment, the additive is added directly into the contact zone 104. While FIG. 1 illustrates that the additive introduced at introduction points 122, 124 and 126 is PAC conditioned on-site (e.g., hydrated at or proximate to the introduction point), in further embodiments the additive comprises other suitable materials and/or can be preconditioned (e.g., pre-hydrated and dried).

In still further embodiments, the additive is introduced downstream of the contact zone 104 at introduction point 130. In yet another embodiment, the additive is introduced in the bag house 106 at introduction point 132 (e.g., the additive can be introduced at an inlet, an outlet, or into one or more individual bag house cells). In some embodiments, the additive is introduced after a cyclone or electrostatic precipitator proximate to the bag house 106 inlet. In several embodiments where the additive is introduced in or adjacent to the bag house 106, the additive is dried or partially dried so as to not introduce excess fluid to the filtration bags in the bag house 106. In other embodiments, the additive is conditioned in situ in the bag house 106 (e.g., moisture/steam and additive are added to the bag house 106), and the moisture can be preferentially absorbed by the additive. While FIG. 1 illustrates that the additive introduced at introduction points 130 and 132 is preconditioned PAC (e.g., pre-hydrated and dried), in further embodiments the additive comprises other suitable materials and/or can be conditioned in situ. Further, the additive can be introduced in response to a sensed condition (e.g., an additive introduction mechanism can be in communication with a sensor). In some embodiments, the additive is introduced in response to a sensed mercury level. In other embodiments, the additive is introduced continuously, dynamically, or at a pre-set timing interval. In various embodiments, the additive introduction can be pressurized or non-pressurized (e.g. gravity-fed).

Figure 2:
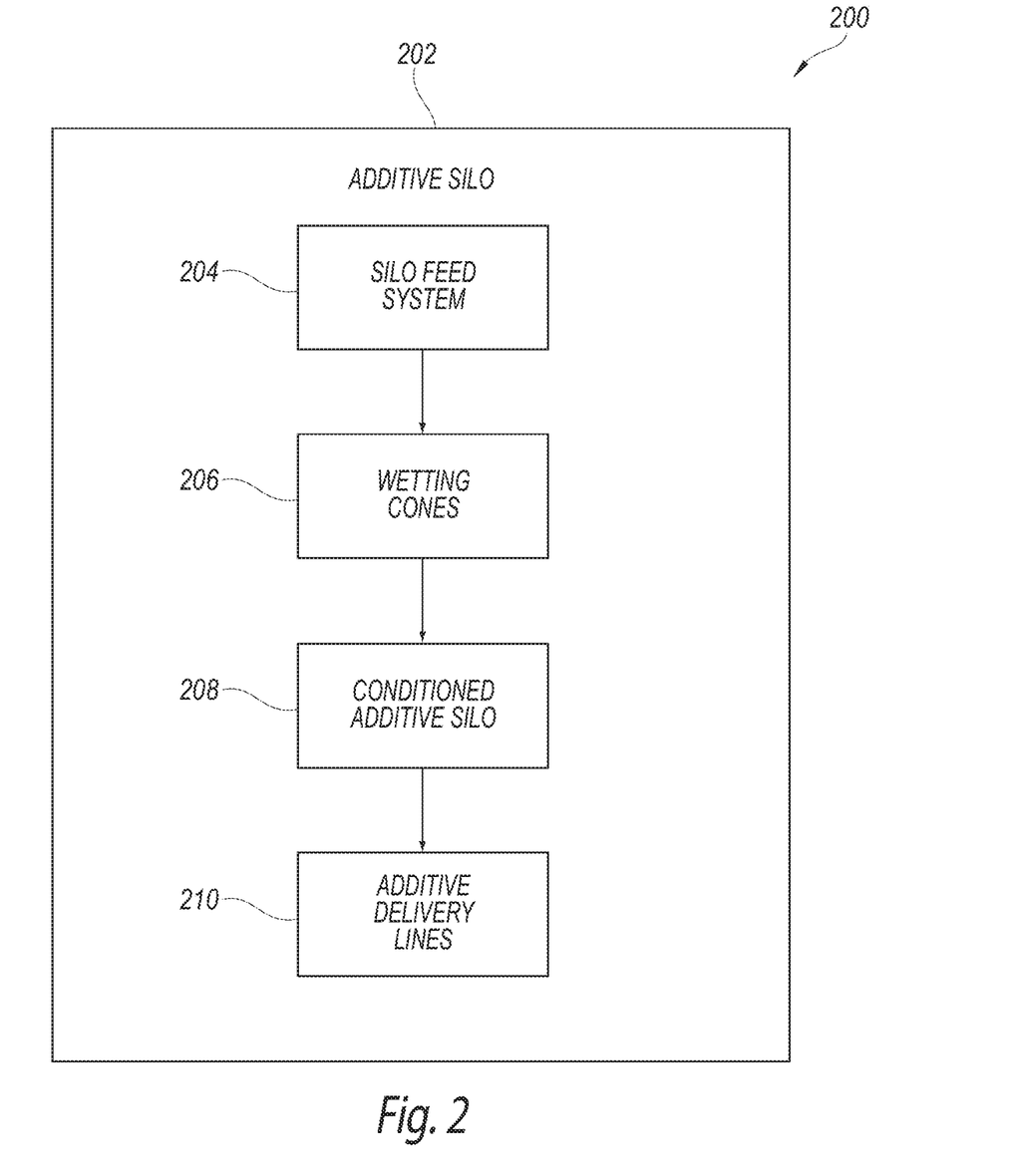
FIG. 2 is a schematic illustration of an additive slurry system configured in accordance with embodiments of the technology.

FIG. 2 is schematic illustration of an additive slurry system 200 configured in accordance with embodiments of the technology. The slurry system 200 can be used to supply a conditioned additive to the emissions handling system 100 illustrated in FIG. 1. For example, in some embodiments, the slurry system 200 can be used to condition an additive for introduction to the emissions handling system 100 at points such as 122, 124, or 126, or other location shown in FIG. 1.

The slurry system 200 comprises an additive silo 202 configured to accept raw additive such as PAC. As will be described in further detail below with reference to FIG. 3, the additive silo 202 contains or is coupled to a silo feed system 204 configured to break up and/or meter additive for admixture with a conditioning agent (e.g., water or other fluid). The conditioning agent can be contained in one or more conditioner (e.g., hydration) silos or wetting cones 206. After the additive from the additive silo meets the conditioner from the wetting cones 206, the additive becomes conditioned and can be stored in a conditioned additive silo 208. In one embodiment, the conditioned additive silo 208 is configured to store hydrated PAC slurry. The conditioned additive can be metered for delivery to the emissions pathway discussed above with reference to FIG. 1 via one or more conditioned additive delivery lines 210.

Figure 3:
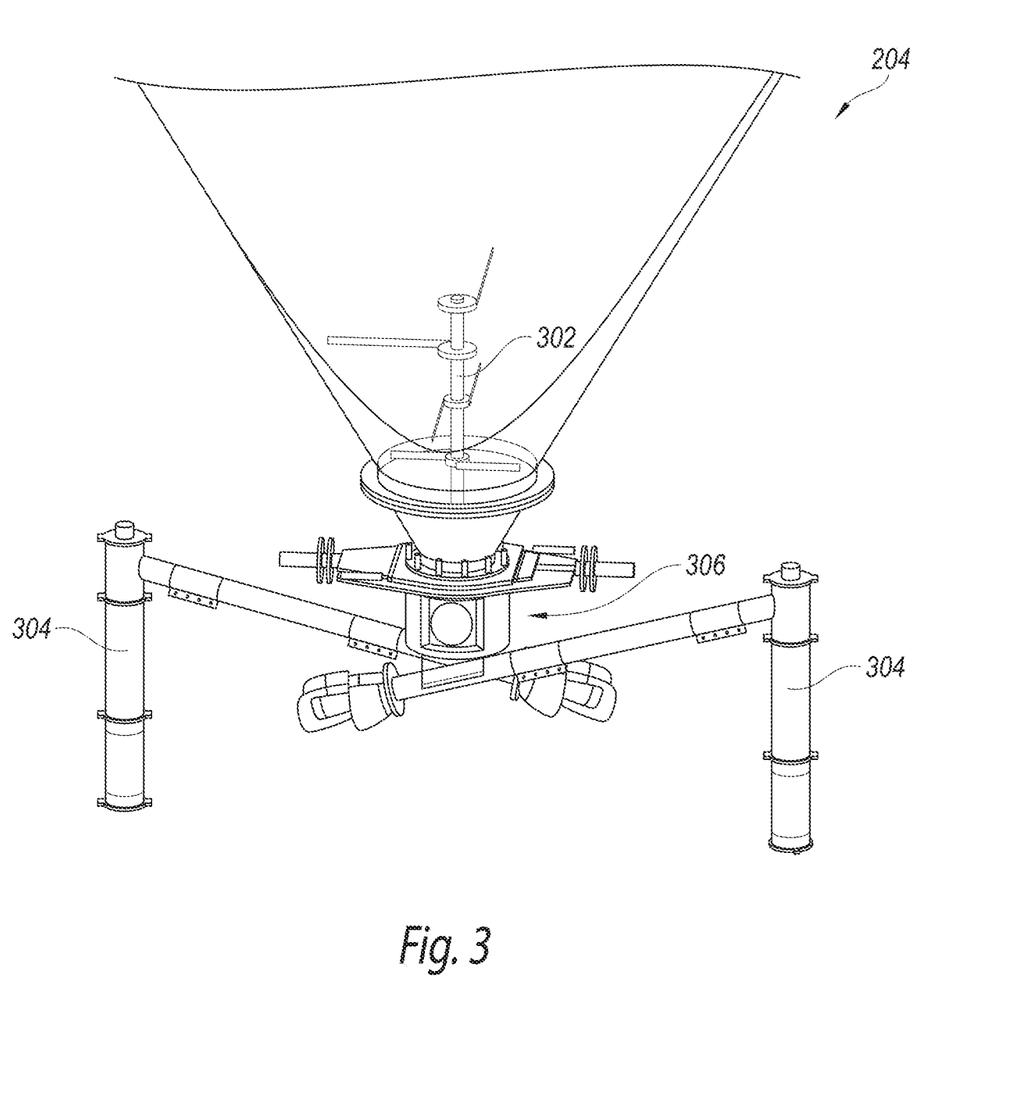
FIG. 3 is an isometric, partially cut-away view of a silo feed system configured in accordance with embodiments of the technology.

FIG. 3 is an isometric, partially cut-away view of the silo feed system 204 of FIG. 2, configured in accordance with embodiments of the technology. The silo feed system 204 includes an arch breaker 302 configured to break up and/or meter the additive. The additive can be redirected at region 306 toward conditioner silos (e.g., wetting cones 206 in FIG. 2) via one or more screw feeders 304. In some embodiments, the screw feeders 304 compact or meter the additive. The screw feeders 304 can operate simultaneously or redundantly during system repairs. The additive can processed by the silo feed system 204 at a selected rate to achieve the desired degree of mercury removal. For example, in some embodiments, PAC can be passed through the silo feed system 204 at a rate of about 10 to 250 pounds per hour. In a particular embodiment, the PAC is processed at a rate of about 90 pounds per hour.

Figure 4:
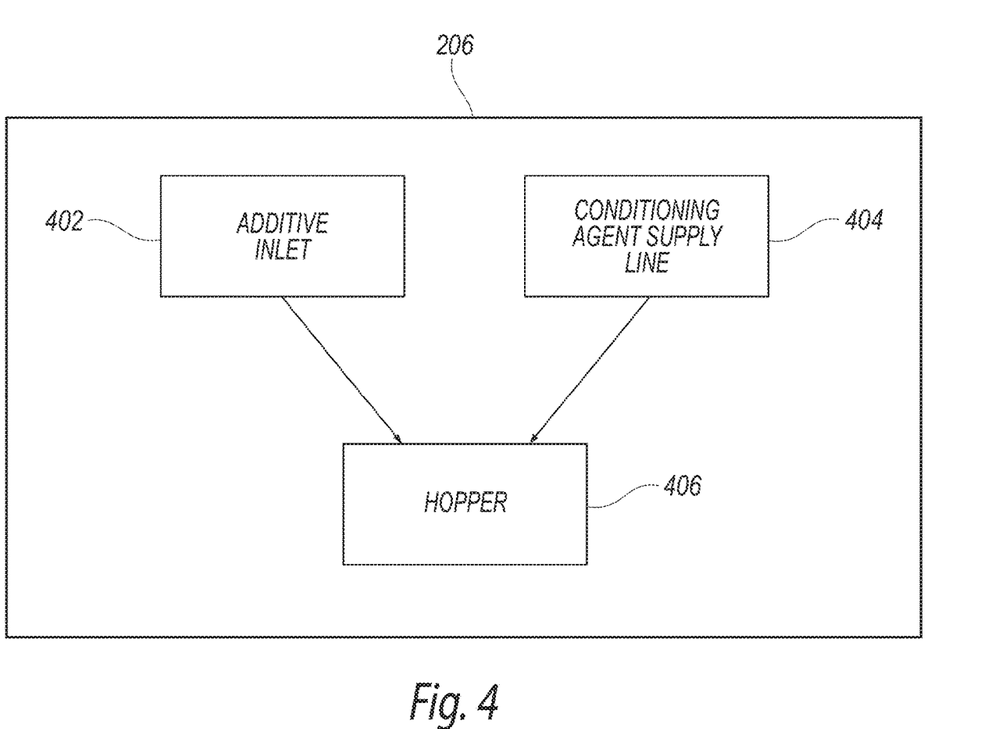
FIG. 4 is a schematic illustration of a conditioner silo configured in accordance with embodiments of the technology.

FIG. 4 is a schematic illustration of the conditioner silo 206 configured in accordance with embodiments of the technology. The conditioner silo 206 includes an inlet 402 configured to receive additive from the silo feed system 204 (e.g., from the screw feeder 304 shown in FIG. 3). Metered quantities of conditioning agent (e.g., water) are introduced to the additive from a conditioning agent supply line 404. The additive and conditioning agent are admixed in a hopper or wetting cone 406 and passed to a conditioned additive silo (e.g., the conditioned additive silo 208 shown in FIG. 2). The additive and conditioning agent can be selected in respective quantities to achieve a desired level of dilution. For example, in one embodiment, water and PAC are combined to form an approximately 1%-10% solution of hydrated PAC. In a particular embodiment, water and PAC are combined to form an approximately 1%-7% solution. The conditioned additive is ready for introduction to the emissions pathway of the emissions handling system 100 shown in FIG. 1 via one or more dedicated or shared supply lines.

While FIGS. 2 through 4 illustrate a particular set of devices for conditioning (i.e., hydrating) an additive, in further embodiments numerous other conditioning devices and methods can be used. For example, heaters, coolers, steam generators, dryers, nozzles, atomizers, throat nozzles, converging and/or diverging nozzles, metering devices, compactors, or other devices can be used individually or in combination to condition, initialize, or otherwise prepare one or more additives for introduction to the emissions handling system 100. Further in some embodiments, one or more conditioned or non-conditioned additives can be added in combination at the same or multiple spots in the system 100.

Figure 5:
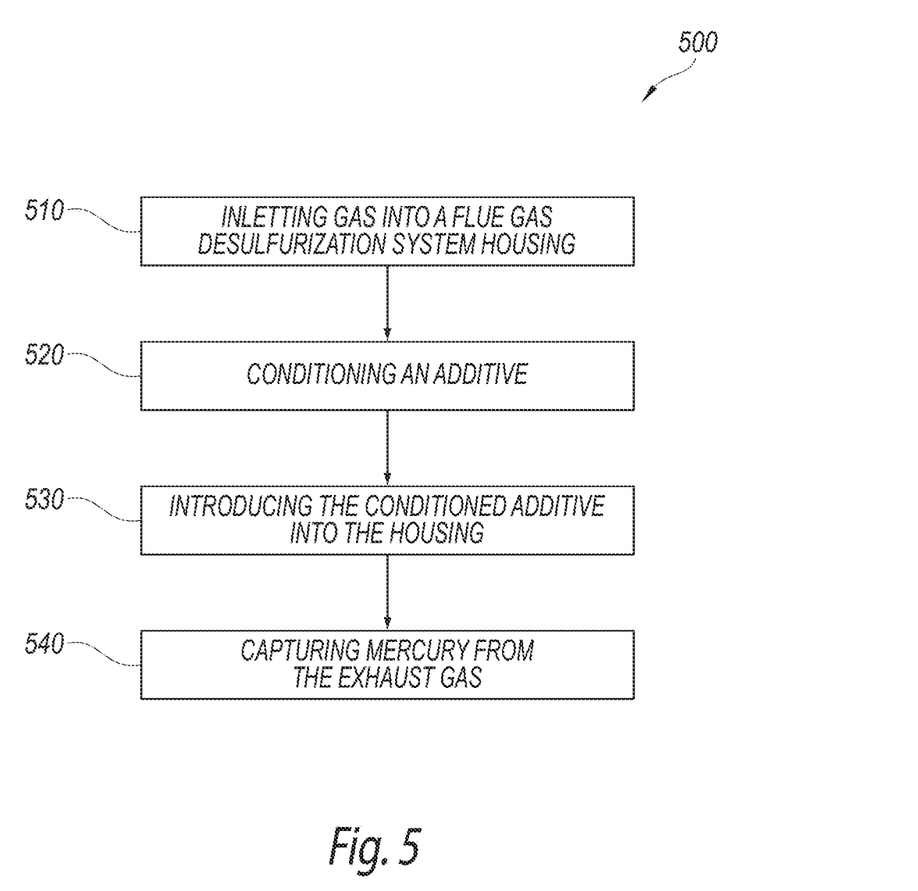
FIG. 5 is a block diagram illustrating a method of removing mercury from exhaust gas in a flue gas desulfurization system in accordance with embodiments of the technology.

FIG. 5 is a block diagram illustrating a method 500 of removing mercury from exhaust gas in a flue gas desulfurization system in accordance with embodiments of the technology. In some embodiments, the method 500 includes inletting the gas into a flue gas desulfurization system housing 510. The method 500 further includes conditioning an additive 520. The conditioning can comprise hydrating, drying, heating, etc. In particular embodiments, conditioning the additive comprises hydrating PAC with water. In another particular embodiment, the conditioning comprises drying previously-hydrated PAC. The drying can comprise removing free water, physisorbed water, or chemisorbed water.

The method 500 further includes introducing the conditioned additive into the housing 530. The introduction can be done by a gravity feed, pump, drip mechanism, nozzle, throat, atomizer, or other delivery device. In some embodiments, the introduction comprises automatically controlling or modifying a dilution percentage of the hydrated PAC. In further embodiments, the introduction comprises automatically modifying a timing of introduction. In some embodiments, the automatic modification of introduction can be in response to a sensed temperature, mercury level, dew point, approach to saturation temperature, water partial pressure, humidity, or other condition. In still further embodiments, the conditioned additive can be introduced at a pre-set timing interval. The method 500 additionally includes capturing mercury from the gas with the conditioned additive 540.

Figure 6:
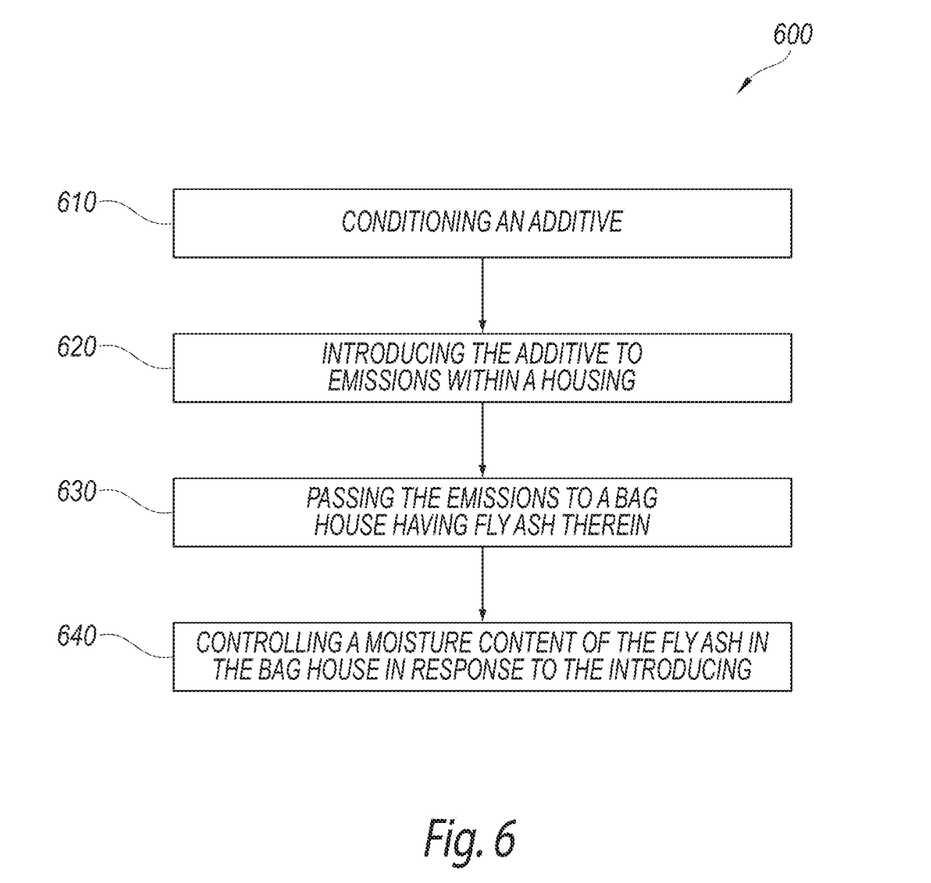
FIG. 6 is a block diagram illustrating a method of controlling a moisture content of fly ash in a bag house in accordance with embodiments of the technology.

FIG. 6 is a block diagram illustrating a method 600 of controlling a moisture content of fly ash in a bag house in accordance with embodiments of the technology. The method 600 includes conditioning an additive 610 (e.g., PAC) in any of the manners described above. The additive is introduced to emissions within a housing 620. In various embodiments, the additive can be conditioned in situ (e.g., by combining the additive with liquid water or steam in the housing with the emissions) or prior to introduction to the emissions in the housing (e.g., by pre-hydrating and drying the additive). In some embodiments, the introduction comprises pumping the additive into a flue-gas desulfurization system.

The emissions are passed to a bag house having flay ash therein 630. The method 600 further includes controlling a moisture content of the fly ash in the bag house in response to the introducing 640. For example, in some embodiments, the type of additive, the method of additive conditioning, and/or the means of additive introduction to the emissions can allow a user to control the moisture content in the fly ash and/or operate the system to achieve a desired level of moisture.

EXAMPLES

1. A method of removing mercury from exhaust gas in a flue gas desulfurization system, the method comprising:
   inletting the gas into a housing;
   conditioning an additive;
   introducing the conditioned additive into the housing; and
   capturing mercury from the gas.

2. The method of example 1 wherein conditioning the additive comprises conditioning powder activated carbon.

3. The method of example 2 wherein conditioning powder activated carbon comprises hydrating the powder activated carbon with water.

4. The method of example 3 wherein hydrating the powder activated carbon comprises forming an approximately 1%-7% solution of hydrated powder activated carbon.

5. The method of example 3, further comprising drying previously-hydrated powder activated carbon, wherein introducing the conditioned additive comprises introducing the dried, previously-hydrated powder-activated carbon.

6. The method of example 1 wherein introducing the conditioned additive comprises introducing the conditioned additive via an atomizer, throat, or nozzle.

7. The method of example 1 wherein introducing the conditioned additive into the housing comprises automatically modifying a dilution percentage of the conditioned additive.

8. The method of example 1, further comprising sensing at least one of a mercury level, temperature or humidity condition.

9. The method of example 8 wherein introducing the conditioned additive comprises automatically introducing the conditioned additive in response to the sensed mercury level.

10. The method of example 1 wherein introducing the conditioned additive comprises introducing the conditioned additive continuously or at a pre-set timing interval.

11. A method, comprising:
conditioning an additive;
introducing the conditioned additive to emissions within a housing;
passing the emissions to a baghouse, the baghouse having fly ash therein; and controlling a moisture content of the fly ash in the baghouse in response to the introducing.

12. The method of example 11, further comprising hydrating the fly ash.

13. The method of example 11 wherein conditioning the additive comprises hydrating and at least partially drying the additive.

14. The method of example 11 wherein conditioning the additive comprises hydrating the additive within the housing.

15. The method of example 11 wherein conditioning the additive comprises hydrating the additive prior to introducing the additive into the housing.

16. The method of example 11 wherein conditioning the additive comprises introducing steam or water to the additive.

17. The method of example 11 wherein introducing the conditioned additive to emissions comprises pumping the conditioned additive into a flue-gas desulfurization system.

18. A flue gas desulfurization system, comprising:
a source of emissions, the emissions including mercury;
a housing comprising an inlet in communication with the source, and an outlet in communication with a baghouse;
a source of conditioned additive; and
an introducer configured to introduce the conditioned additive to the housing.

19. The system of example 18 wherein the introducer comprises an atomizer, throat, or nozzle configured to inject the conditioned additive to the housing.

20. The system of example 18, further comprising a sensor configured to sense at least one of a mercury level, temperature, dew point, or pressure, wherein the sensor is in communication with the introducer.

21. The system of example 18 wherein the source of the emissions comprises at least one of a coke processing system, a power plant, a trash to steam plant, a carbon alloy processing system, a dry sulfur removal system, or a hot ash circulator.

22. The system of example 18 wherein the source of the conditioned additive comprises:
an additive silo;
a hydration silo; and
a slurry silo coupled to the introducer and configured to receive material from the additive silo and the hydration silo.

23. The system of example 22, further comprising a breaker positioned in the additive silo and configured to break up the additive.

24. The system of example 22 wherein the hydration silo comprises a generally-conical shape and is configured to meter fluid introduction to the slurry silo.

25. The system of example 18 wherein the introducer comprises a supply line in fluid connection with the source of conditioned additive and a source of dilution water.

26. The system of example 18 wherein the introducer comprises a supply line in fluid connection with the source of conditioned additive and a source of lime slurry.

27. A method, comprising:
introducing an additive to emissions within a bag house; the bag house having fly ash therein;
conditioning one or both of the additive or the fly ash; and
controlling a moisture content of the fly ash in the bag house.

28. The method of example 27 wherein conditioning one or both of the additive or the fly ash comprises hydrating one or both of the additive or the fly ash.

29. The method of example 27 wherein introducing an additive to emissions within a bag house comprises introducing dry powder-activated carbon to the emissions within a bag house.

From the foregoing it will be appreciated that, although specific embodiments of the technology have been described herein for purposes of illustration, various modifications may be made without deviating from the spirit and scope of the technology. For example, while the conditioned additive is illustrated as being introduced into various locations in the emissions pathway, in further embodiments, the conditioned additive can be introduced further upstream, further downstream, at multiple locations, or by different means than shown. Further, certain aspects of the new technology described in the context of particular embodiments may be combined or eliminated in other embodiments. For example, while the conditioned additive is described in several embodiments as being hydrated PAC, in further embodiments the conditioned additive can comprise any substance having suitable material properties for use in the systems described herein. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

We claim:
1. A method of removing mercury from exhaust gas in a flue gas desulfurization system, the method comprising:
inletting the gas into a housing;
adding water via a supply line to the housing upstream of a contact zone comprising a dry scrubber;

introducing an additive into the supply line upstream of the contact zone;

introducing the additive into the contact zone such that the additive contacts the gas; and capturing mercury from the gas.

2. The method of claim 1, further comprising hydrating the additive to increase a moisture content of the additive by adding water to the additive prior to introducing the additive to the supply line.

3. The method of claim 2, further comprising drying previously-hydrated additive, which removes excess fluid from the additive but leaves it with an increased moisture content.

4. The method of claim 1 wherein introducing the additive into the supply line comprises introducing the additive via an atomizer, throat, or nozzle.

5. The method of claim 1 wherein introducing the additive into the housing into the supply line comprises automatically modifying a dilution percentage of the additive.

6. The method of claim 1, further comprising sensing at least one of a mercury level, temperature or humidity condition.

7. The method of claim 6 wherein introducing the additive into the supply line comprises automatically introducing the additive in response to the sensed mercury level.

8. The method of claim 1 wherein introducing the additive into the supply line comprises introducing the additive continuously or at a pre-set timing interval.

9. A method of removing mercury from exhaust gas in a flue gas desulfurization system, the method, comprising:

adding water via a supply line to a housing configured to contain emissions;

introducing an additive into the supply line upstream of a contact zone;

introducing the additive to the emissions within the housing upstream of the contact zone;

passing the emissions to a baghouse, the baghouse having fly ash therein; and capturing mercury from the emissions.

10. The method of claim 9, further comprising (i) hydrating the additive, to increase a moisture content thereof, prior to including the additive into the supply line, and (ii) hydrating the fly ash.

11. The method of claim 10 wherein hydrating the additive comprises hydrating and at least partially drying the additive.

12. The method of claim 10 wherein hydrating the additive comprises introducing steam or water to the additive.

13. The method of claim 9 wherein introducing the additive into the supply line comprises pumping the additive into a flue-gas desulfurization system.

* * * * *

UNITED STATES PATENT AND TRADEMARK OFFICE
CERTIFICATE OF CORRECTION

PATENT NO. : 11,117,087 B2
APPLICATION NO. : 16/000516
DATED : September 14, 2021
INVENTOR(S) : Quanci et al.

It is certified that error appears in the above-identified patent and that said Letters Patent is hereby corrected as shown below:

On the Title Page

On Page 6, item (56) in Column 2, Line 46, delete "Appliation" and insert --Application-- therefor.

In the Specification

In Column 7, Line 32, after "and", insert --¶--.

In the Claims

In Column 10, Claim 10, Line 16, delete "including" and insert --introducing-- therefor.

Signed and Sealed this
Fourteenth Day of June, 2022

Katherine Kelly Vidal
*Director of the United States Patent and Trademark Office*